(12) United States Patent
Tanoue

(10) Patent No.: US 7,585,588 B2
(45) Date of Patent: Sep. 8, 2009

(54) BATTERY POSITIVE ELECTRODE MATERIAL

(75) Inventor: Koji Tanoue, Honjo (JP)

(73) Assignee: Dowa Mining Co., Ltd., Tokyo (JP)

( * ) Notice: Subject to any disclaimer, the term of this patent is extended or adjusted under 35 U.S.C. 154(b) by 710 days.

(21) Appl. No.: 11/315,207

(22) Filed: Dec. 23, 2005

(65) Prior Publication Data

US 2006/0141360 A1 Jun. 29, 2006

(30) Foreign Application Priority Data

Dec. 27, 2004 (JP) ............................ 2004-375474

(51) Int. Cl.
*H01M 2/08* (2006.01)
(52) U.S. Cl. ...................................... 429/174
(58) Field of Classification Search .................. 429/174
See application file for complete search history.

(56) References Cited

U.S. PATENT DOCUMENTS

2002/0127469 A1* 9/2002 Mori et al. .................. 429/174

FOREIGN PATENT DOCUMENTS

| JP | 57-000849 | 5/1982 |
|---|---|---|
| JP | 10-188975 | 7/1998 |

* cited by examiner

*Primary Examiner*—Dah-Wei D Yuan
*Assistant Examiner*—Patricia Davis
(74) *Attorney, Agent, or Firm*—Clark & Brody

(57) ABSTRACT

A material for the positive electrode of a silver oxide battery is provided that increases the discharge capacity of the battery. The positive electrode material is a conductive composite oxide represented by the general formula $Ag_xNi_yO_2$, in which X/Y is greater than 1 and does not exceed 1.9, and by the general formula $Ag_xNi_yM_zO_2$, in which M represents at least one of Cu and Bi, X/(Y+Z) is greater than 1 and does not exceed 1.9, and Z does not exceed 0.4. These conductive oxides contain almost no free $Ag_2O$ and have a crystal structure similar to that of $AgNiO_2$. As a result, the excess Ag—Ni oxide is conductive and has a high discharge capacity.

4 Claims, 2 Drawing Sheets

BATTERY POSITIVE ELECTRODE MATERIAL

FIELD OF THE INVENTION

The present invention relates to a material for the positive electrode of a battery.

DESCRIPTION OF THE PRIOR ART

Small silver oxide alkaline batteries (commonly called "button" batteries) are in general use. In a silver oxide battery, silver oxide is used as the positive electrode material, zinc dust as the negative electrode material, and for the electrolyte, an alkaline solution, such as an aqueous solution of KOH or NaOH. Silver oxide has a high discharge capacity, but because silver oxide itself has a resistance that is close to that of an insulator, it is usually blended with a conductive material such as graphite to impart conductivity to the positive electrode material.

Reference Nos. 1 to 3 disclose the use of the silver-nickel compound oxide $AgNiO_2$ as a battery positive electrode material. Reference No. 1 (JP S57-849A), for example, describes obtaining a flat discharge voltage curve from a battery having a positive electrode formed of $AgNiO_2$ synthesized by the equimolar (molar ratio=1/1) reaction of silver nitrate and nickel nitrate, and Reference No. 2 (JP H10-188975A) describes a manufacturing method for optimizing a $AgNiO_2$ synthesizing reaction, and a battery with stable discharge characteristics obtained when the $AgNiO_2$ was used as the positive electrode material. Reference No. 3 (US 2002/0127469 A1) describes a button battery with an electrode container containing $AgNiO_2$ mixed with silver oxide or manganese dioxide.

OBJECT OF THE INVENTION

It may be possible for batteries with positive electrodes constituted by the $AgNiO_2$ described in the above references to exhibit high capacity and stable discharge characteristics. However, in practice such a technology has not been realized. Current silver oxide batteries generally use silver oxide as the positive electrode material, blended with an appropriate amount of graphite for conductivity. Reasons that can be cited for this include that a $AgNiO_2$ compound has a lower molding density than silver oxide, and therefore a lower discharge capacity per unit volume, and that although, based on the valences of the silver and nickel in the compound, it can be expected to have a theoretical discharge capacity of 270 mAh per unit weight (gram), when the actual capacity factor is taken into consideration, the effective discharge capacity is in the order of 10% lower than the discharge capacity of silver oxide.

Accordingly, when $AgNiO_2$ is used as the positive electrode active material in a small battery having a small volume in an attempt to obtain a battery performance equivalent to that of a conventional silver oxide battery of the same size, in some cases there is not enough space to load the positive electrode compact, forming an obstacle that has made it impossible to constitute a battery that can advantageously take the place of the small silver oxide batteries currently in use.

The object of the present invention is to provide a battery positive electrode material comprised of a conductive composite oxide of silver and nickel having a higher molding density and higher discharge capacity than $AgNiO_2$.

SUMMARY OF THE INVENTION

Based on the results of many experiments and studies, the present inventors succeeded in synthesizing a silver-nickel composite oxide containing more excess silver than $AgNiO_2$. This excess silver composite oxide has a crystal structure that is substantially the same as that of $AgNiO_2$ while at the same time having a higher discharge capacity than $AgNiO_2$ as well as good conductivity, and forms a powder with a high molding density.

In accordance with the present invention, the above object is attained by providing a battery positive electrode material comprising a conductive chemical compound represented by the general formula $Ag_xNi_yO_2$, wherein X/Y is greater than 1, preferably greater than 1.1, and does not exceed 1.9). In X-ray diffraction, the conductive compound has a main peak that is identical to that of $AgNiO_2$ (wherein X=Y=1), and does not exhibit an $Ag_2O$ or $AgO$ peak.

It was also found that when Cu or Bi is substituted for part of the Ni in the compound, the excess silver composite oxide thus formed also has a higher discharge capacity than $AgNiO_2$, good conductivity and a high molding density. Thus, in accordance with this invention, the above object is also attained by a battery positive electrode material comprising a conductive chemical compound represented by the general formula $Ag_xNi_yM_zO_2$, wherein M represents at least one of Cu and Bi, X/(Y+Z) is greater than 1 and does not exceed 1.9, and Z does not exceed 0.4.

These $Ag_xNi_yO_2$ system (X/Y>1) and $Ag_xNi_yM_zO_2$ system (X/(Y+Z)>1, Z<0.4) excess silver composite oxides have excellent molding density, discharge capacity and conductivity, and when used singly or in combination with silver oxide as a positive electrode material, makes it possible to improve battery performance while retaining the same small size as that of a conventional silver oxide battery.

DETAILED DESCRIPTION OF THE INVENTION

The present inventors discovered a chemical compound that, even with a higher silver content than $AgNiO_2$, has a crystal structure similar to that of $AgNiO_2$, discharge characteristics and conductivity equivalent or superior to those of $AgNiO_2$, and forms a powder having high molding density. Although the molar ratio of Ag/Ni in this compound is larger than 1, and thus is larger than in the case of $AgNiO_2$, it has a crystal structure equivalent to that of $AgNiO_2$, and can therefore be represented by the general formula $Ag_xNi_yO_2$ (X/Y>1). Preferably, X/Y is 1.1 or above or, depending on the case, 1.2 or above, and does not exceed 1.9.

The compound can be called an excess Ag—Ni delafossite type oxide, which hereinbelow is shortened to "excess Ag—Ni oxide." As in the case of $AgCoO_2$ and the like, $AgNiO_2$ can be regarded as being a delafossite oxide represented by $ABO_2$, with A as a univalent metal and B as a trivalent metal. A delafossite oxide has a crystal structure comprising alternating packed beds of A-O-B-O-, and although it is an oxide, it is conductive. While the excess Ag in the case of the Ag—Ni oxide of this invention also can be described as a departure from previously-defined delafossite oxides in which the Ag and Ni are equimolar, what this invention has clarified is that it has the same crystal structure and exhibits good conductivity.

Figure 1:
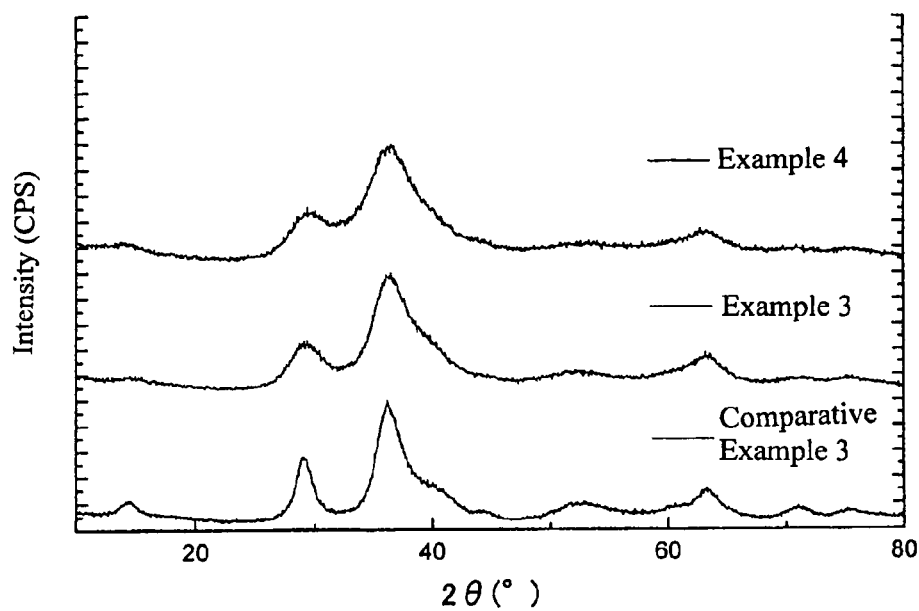
FIG. 1 are X-ray diffraction charts of representative excess Ag—Ni oxides according to the invention, shown compared to the X-ray diffraction of $AgNiO_2$.

FIG. 1 shows the X-ray diffraction patterns of the excess Ag—Ni oxides of the below-described inventive Examples 3 and 4, compared to that of the $AgNiO_2$ of Comparative Example 3. As is clear from FIG. 1, the main peaks of the excess Ag—Ni oxide of Example 3 in which the Ag/Ni molar ratio is 1.2/0.80, that is, X/Y=1.50, and of the excess Ag—Ni oxide of Example 4 in which the Ag/Ni molar ratio is 1.3/0.70, that is, X/Y=1.86, coincide with the main peak of the $AgNiO_2$ compound of Comparative Example 3, which is a delafossite type oxide, and the other peaks also substantially coincide.

Figure 2:
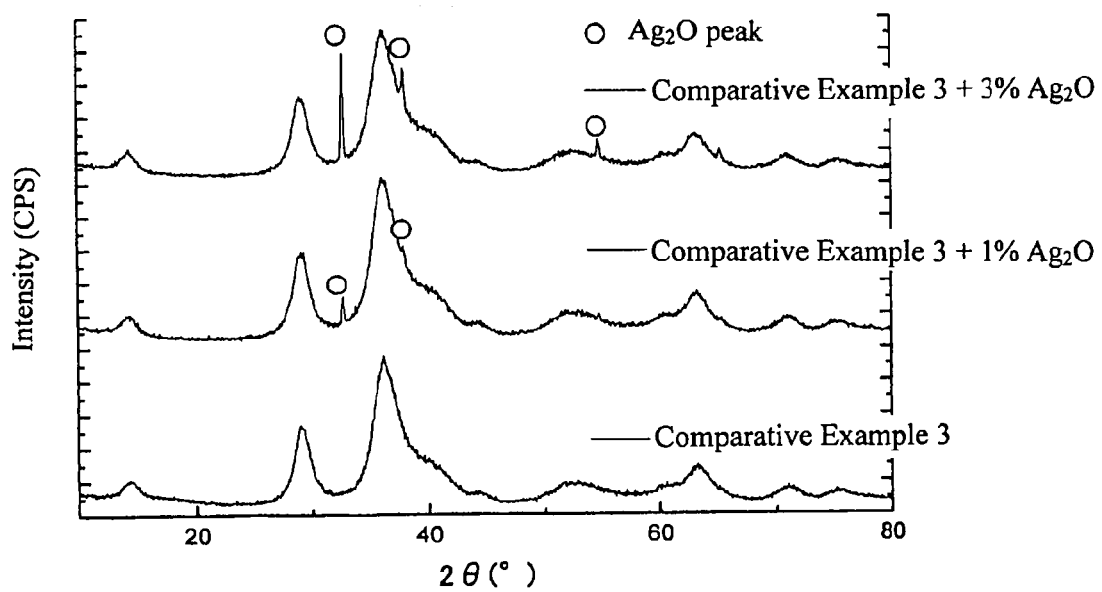
FIG. 2 are X-ray diffraction charts of powders comprising $AgNiO_2$ mixed with 2% by weight, and 3% by weight, of $Ag_2O$.

FIG. 2 shows the X-ray diffraction patterns of powders comprising $AgNiO_2$ mixed with 2% by weight, and 3% by weight, of $Ag_2O$, compared to that of the $AgNiO_2$ of Comparative Example 3. As can be seen in FIG. 2, even when 1% or 3% by weight of $Ag_2O$ is mixed with $AgNiO_2$, the $Ag_2O$ peaks (indicated by the ○ symbol) are clearly defined. From these results, it can be stated that there is almost no free $Ag_2O$ in the excess Ag—Ni oxides of Examples 3 and 4 of FIG. 1, or even that there is no free $Ag_2O$ at all.

With the horizontal axis in the graph of FIG. 3 being the silver content (wt %) of each of the excess Ag—Ni oxides of the Examples described below, and the vertical axis the discharge capacity (mAh/g) of the excess Ag—Ni oxides, the graph shows the correlation (the symbol ♦) between silver content and discharge capacity in the case of the excess Ag—Ni oxides of the invention. The symbol ■ in FIG. 3 denotes values of $Ag_2O$ alone. It was expected that the discharge capacity would increase in a straight line as, starting with the $AgNiO_2$ of Comparative Example 3, the silver content was gradually increased until the silver content of $Ag_2O$ was finally reached. However, this was not the case. Instead, as shown by the solid line in FIG. 3, the increase was steeper. This shows that even when the silver content is the same, positive electrode material having superior performance can be obtained by incorporating the silver in the crystals as excess Ag—Ni oxide, rather than by mixing it with the $AgNiO_2$ in the form of $Ag_2O$, that is, rather than as free $Ag_2O$.

As described in the Examples below, it was also confirmed that the excess Ag—Ni oxide according to the invention has good conductivity (reduced resistivity). With respect also to moldability, under identical conditions, the excess Ag—Ni oxide of the invention exhibited higher molding density than $AgNiO_2$.

Thus, the excess Ag—Ni oxide of the invention can be used on its own as a positive electrode material. Moreover, by substituting the excess Ag—Ni oxide for part of the silver oxide used as the positive electrode material in a silver oxide battery, it is possible to obtain a high-performance positive electrode material having good conductivity and moldability, even without blending graphite or the like with the material. Improvements in the conductivity, moldability and pellet strength of silver oxide can be achieved by blending in amounts of the excess Ag—Ni oxide starting from a few weight percent. Therefore, the amount of such addition is set at 2 wt % or more, preferably 3 wt % or more, and more preferably 5 wt % or more.

Part of the Ni in the excess Ag—Ni oxide can be replaced by element M (Cu and/or Bi). Specifically, a compound represented by a general formula $Ag_xNi_yM_zO_2$ (wherein M is at least one of Cu and Bi, X/(Y+Z) is greater than 1 and does not exceed 1.9, and Z does not exceed 0.4) exhibits the same conductivity, moldability and discharge characteristics as the above excess Ag—Ni oxide. Such a compound in which part of the Ni is replaced by the element M (Cu and/or Bi) is called an excess Ag—Ni-M oxide.

An excess Ag—Ni-M oxide has the advantage that, compared to an excess Ag—Ni oxide, it can be produced at a lower cost achieved by substituting cheap Cu or Bi for expensive Ni. Moreover, by blending 3 wt % or more excess Ag—Ni-M oxide with the silver oxide used as the positive electrode material in a silver oxide battery, it is possible to obtain a high-performance positive electrode material having good conductivity and moldability, without having to blend graphite or the like with the material.

The positive electrode material of the invention can be produced by a method comprising reacting an inorganic acid salt of Ag and an inorganic acid salt of Ni, or an inorganic acid salt of Ni and an inorganic acid salt of M, in an oxidizing alkaline aqueous solution. This is done using the following procedure.

(1) Reacting the inorganic acid salt of Ag and the inorganic acid salt of Ni, or the inorganic acid salt of Ni and the inorganic acid salt of M, in water with an alkali hydroxide to obtain a neutralizing precipitate.

(2) Carrying out oxidation treatment (increasing metal ion valences) by adding an oxidizing agent to the solution prior to, or during, the above neutralization reaction, or to the obtained precipitate suspension. It is preferable for the addition of the oxidizing agent to be divided into a plurality of stages before, during and after the neutralization reaction.

(3) Separating the oxidized precipitate from the liquid, washing and drying the precipitate, and crushing the resulting dried cake to powder.

NaOH or KOH can be employed as the alkali hydroxide used in the neutralization reaction. Although nitrate, sulfate, hydrochloride, and phosphate and the like of each metal can be used as the inorganic acid salts of Ag, Ni and M, it is preferable to use the nitrate or sulfate of the metals. Typically, the nitrate of each metal may be used. For $AgNO_3$, for example, $Ni(NO_3)_2$ having a desired number of moles can be used, or the required amount of $Cu(NO_3)_2$ or $Bi(NO_3)_3$.

A higher alkalinity is better for the neutralization treatment. In the case of Ag+Ni+(M), for example, the reaction proceeds more readily in the presence of around five times the alkalinity, in terms of molar ratio. Neutralization and oxidation treatments can both be conducted at a reaction temperature of from room temperature to 100° C., and preferably are conducted at 30 to 50° C. It is necessary to stir at an intensity at which the neutralization and oxidation reactions proceed uniformly. Even after the treatments end, the stirring should be maintained at the required temperature for ripening.

The Ag/Ni ratio in the end compound, and by extension the atomic ratio of the Ag/Ni in the particles, can be adjusted to a value within the range 1 to 1.9 by adjusting the molar ratio of the silver nitrate and nickel furnished for the reaction. Similarly, when element M is included, the atomic ratio of the Ag/(Ni+M) in the end compound, and by extension the atomic ratio of the Ag/(Ni+M) in the particles, can be adjusted to a value within the range 1 to 1.9 by adjusting molar ratio of the Ag/(Ni +M) in the salt concerned.

The oxidation treatment comprises using an oxidizing agent to increase metal ion valences. The oxidizing agent can be added at the start of the neutralization reaction or during the neutralization, or added to the precipitate suspension. Thus, the neutralization and oxidation treatments can be done separately or at the same time. It is preferable for the addition of the oxidizing agent to be divided into a plurality of stages before, during and after the neutralization reaction. The oxidation treatment should be done with stirring, and at not more than 100° C., since too high a temperature will promote decomposition of the oxidizing agent. Substances that can be used as the oxidizing agent include, for example, $KMnO_4$, NaOCl, $H_2O_2$, $K_2S_2O_8$, $Na_2S_2O_8$, and ozone, but $K_2S_2O_8$, $Na_2S_2O_8$ or ozone are preferable, since impurities in the excess Ag—Ni oxide powder can be reduced by the use of an oxidizing agent thus constituted. It is necessary to use an amount of oxidizing agent that is enough to change the valences. This can be achieved by adding an amount of oxidizing agent that is at least equivalent to the valences concerned, and preferably is around twice the amount.

EXAMPLES

Before moving on to the following Examples of the invention, the methods used to measure the properties of the powder obtained in each case will be explained.

Particle diameter: Particle diameter was measured using a Helos laser diffraction analyzer manufactured by Sympatec GmbH, which employs a dry system in which the particles are dispersed by a high-pressure gas and laser diffraction used to analyze the particle diameter. In contrast to wet methods which have a major effect on samples and solvent affinity, this dry method enables particle diameter to be measured without any such effects, resulting in the case of this material in measured values having good reproducibility. The dispersion pressure can be set as desired; in this example, a dispersion pressure of 4.00 bar was used.

X-ray diffraction: An X-ray diffractometer manufactured by Rigaku Corporation was used. A CuKα X-ray source was used, and measurements were carried out at an X-ray voltage of 50 kV and current of 100 mA.

Specific surface area: This was measured using a single point BET method. The measurement was performed using a Quantachrome Jr surface area analyzer manufactured by Quantachrome Corporation.

Chemical analysis: Samples were dissolved in nitric acid and chemical analysis performed by the titration method.

Battery evaluation: Discharge capacity of the sample powder was measured using a three-electrode cell. The measurement was conducted using a joined sample prepared by the following. About 100 mg of mixture of 95% sample powder and 5% PTFE was formed into a cylinder having a floor area of 1.77 $cm^2$, then the formed cylinder was bonded by pressure onto a stainless-steel mesh collector to form a joined sample. Metal zinc plates were used for the reference and negative electrodes; 50 mL of a 40% solution of KOH was used as the electrolyte. The discharge capacity was measured at the point at which the voltage reached 1.2 volts.

Resistivity: Samples of each of the powders were subjected to a pressure of 3 t/$cm^2$ (t means metric ton) to form cylindrical pellets having a sectional area of 1 $cm^2$, and copper electrode plates having an area larger than that of the pellet sectional area were affixed to the top and bottom of each pellet. The pellet thus sandwiched between the electrode plates was placed flat on a stainless-steel stand, and a stainless-steel weight with a load of 130 kgf was placed thereon. In that state, a lead line from each electrode was connected to an impedance measuring instrument and the electric resistance (pellet resistance) between the electrodes was measured. The resistance value of the instrument with no pellet in place was obtained beforehand and used to correct the measured values of the pellets.

Molding density: A metal die through which a vertical hole was formed having a sectional area of 1 $cm^2$ was prepared, and a pedestal having the same diameter as that of the hole was inserted into the hole, and 1 g of the sample powder was inserted on the pedestal. Then, a punch having the same diameter as that of the hole was inserted and placed under a load of 3 t to compress the powder for 3 minutes. The molding density was obtained from the thickness and weight of the molding thus formed.

Pellet strength: After a pressure of 3 t/$cm^2$ was used to form a sample powder into a cylindrical pellet having a sectional area of 1 $cm^2$, a load was imposed on the top of each pellet and increased, and the load under which the pellet was destroyed was used as an index of the pellet strength. Evaluations are greatly affected by measurement conditions and methods, so evaluations were made as values relative to a pellet strength (destruction load) of 100 when silver oxide pellets were used.

Comparative Example 1

The Ag content, discharge capacity, molding density and resistivity of powder type silver oxide ($Ag_2O$ manufactured by Dowa Mining Co., Ltd. having an average particle diameter of 15 μm) used for commercial positive electrodes were measured. The results are shown in Table 1. This silver oxide had a purity of at least 99.9%, as calculated from the Ag content. The discharge capacity was 220 mAh/g, close to the theoretical capacity of silver oxide.

Comparative Example 2

The Ag content, discharge capacity, molding density and resistivity of granular type silver oxide (manufactured by Dowa Mining Co., Ltd. with an average particle diameter of 105 μm) used for commercial positive electrodes were measured. The results are shown in Table 1. The discharge capacity and resistivity were the same as those of Comparative Example 1.

Comparative Example 3

2.0 liters of pure water, 9 mols of NaOH and 1 mol of sodium persulfate were put into a 5-liter beaker and the temperature of the solution adjusted to 30° C. One liter of an aqueous solution of silver nitrate equivalent to 1.0 mol of silver was added to the solution over a thirty-minute period, and the solution was maintained at 30° C. for one hour.

One liter of an aqueous solution of nickel nitrate equivalent to 1.0 mol of nickel was added to the solution over a thirty-minute period, and the solution was maintained at 30° C. for four hours and the reaction ended. The reaction slurry was filtered to obtain a black cake. The cake was thoroughly washed with pure water and then dried in a vacuum for 12 hours at 100° C. A pestle was then used to crush the dried cake. When X-ray diffraction was used to identify the black powder thus obtained, it was confirmed to be $AgNiO_2$. The X-ray diffraction chart of the powder is shown in FIG. 1. The results of the evaluation test of the powder are shown in Table 1.

Example 1

2.0 liters of pure water, 9 mols of NaOH and 1 mol of sodium persulfate were put into a 5-liter beaker and the temperature of the solution adjusted to 30° C. One liter of an aqueous solution of silver nitrate equivalent to 1.05 mols of silver was added to the solution over a thirty-minute period, and the solution was maintained at 30° C. for two hours.

One liter of an aqueous solution of nickel nitrate equivalent to 0.95 mol of nickel was added to the solution over a thirty-minute period and was followed by the addition of 1 mol of sodium persulfate, and the solution was maintained at 30° C for 12 hours to end the reaction. The reaction slurry was filtered to obtain a black cake. The cake was thoroughly washed with pure water and then dried in a vacuum for 12 hours at 100° C. A pestle was then used to crush the dried cake. When X-ray diffraction was used to identify the black powder thus obtained, a peak similar to that of $AgNiO_2$ was observed. The X-ray diffraction chart of the powder is shown in FIG. 1. It can be seen that the peak that appeared is the same as that of the Comparative Example 3, but there is no silver oxide peak. The results of the evaluation test of the powder are shown in Table 1.

FIG. 2 shows X-ray diffraction charts of powders consisting of the $AgNiO_2$ powder of Comparative Example 3 mixed with 1% by weight, and 3% by weight, of $Ag_2O$. The ○ symbol in FIG. 2 denotes a $Ag_2O$ peak. Even though the amount of $Ag_2O$ in the mixture is very small, an $Ag_2O$ peak did appear. Based on the X-ray diffraction chart thereof, this clearly shows that the excess Ag—Ni oxide of Example 1 contains almost no free $Ag_2O$, or contains none at all.

Example 2

The same procedure as that of Example 1 was repeated, except that an aqueous solution of silver nitrate equivalent to 1.10 mols of silver and an aqueous solution of nickel nitrate equivalent to 0.90 mol of nickel were used. When X-ray diffraction was used to identify the black powder thus obtained, a peak similar to that of $AgNiO_2$ was observed. No silver oxide peak was observed. The results of the evaluation test of the powder are shown in Table 1.

Example 3

The same procedure as that of Example 1 was repeated, except that an aqueous solution of silver nitrate equivalent to 1.20 mols of silver and an aqueous solution of nickel nitrate equivalent to 0.80 mol of nickel were used. When X-ray diffraction was used to identify the black powder thus obtained, a peak similar to that of $AgNiO_2$ was observed. No silver oxide peak was observed. The X-ray diffraction chart of the powder is shown in FIG. 1. The results of the evaluation test of the powder are shown in Table 1.

Reference Example 1

25 wt % of the $Ag_2O$ of Comparative Example 1 and 75 wt. % of the $AgNiO_2$ synthesized in Comparative Example 3 were thoroughly mixed. The mixture had a silver content that was substantially equivalent to the silver content of the excess Ag—Ni oxide synthesized in Example 3. The results of the evaluation test of this mixed powder are shown in Table 1.

Example 4

The same procedure as that of Example 1 was repeated, except that an aqueous solution of silver nitrate equivalent to 1.30 mols of silver and an aqueous solution of nickel nitrate equivalent to 0.70 mol of nickel were used. When X-ray diffraction was used to identify the black powder thus obtained, a peak similar to that of $AgNiO_2$ was observed. No silver oxide peak was observed. The results of the evaluation test of the powder are shown in Table 1.

Reference Example 2

36 wt % of the $Ag_2O$ of Comparative Example 1 and 64 wt. % of the $AgNiO_2$ synthesized in Comparative Example 3 were thoroughly mixed. The mixture had a silver content that was substantially equivalent to the silver content of the excess Ag—Ni oxide synthesized in Example 4. The results of the evaluation test of this mixed powder are shown in Table 1.

Reference Example 3

The same procedure as that of Example 1 was repeated, except that an aqueous solution of silver nitrate equivalent to 1.40 mols of silver and an aqueous solution of nickel nitrate equivalent to 0.60 mol of nickel were used. When X-ray diffraction was used to identify the black powder thus obtained, a peak similar to that of $AgNiO_2$ was observed, and an $Ag_2O$ (111) plane peak was also observed. The results of the evaluation test of the powder are shown in Table 1.

Example 5

A. The same procedure as that of Example 2 was repeated, except that the aqueous solution of nickel nitrate equivalent to 0.90 mol of nickel was changed to an aqueous solution of nickel nitrate equivalent to 0.72 mol of nickel and an aqueous solution of copper nitrate equivalent to 0.18 mol of copper. The results of the evaluation test of the powder thus obtained are shown in Table 1.

B. The same procedure as that of Example 2 was repeated, except that the aqueous solution of nickel nitrate equivalent to 0.90 mol of nickel was changed to an aqueous solution of nickel nitrate equivalent to 0.54 mol of nickel and an aqueous solution of copper nitrate equivalent to 0.36 mol of copper. The results of the evaluation test of the powder thus obtained are shown in Table 1.

C. The same procedure as that of Example 3 was repeated, except that the aqueous solution of nickel nitrate equivalent to 0.80 mol of nickel was changed to an aqueous solution of nickel nitrate equivalent to 0.60 mol of nickel and an aqueous solution of copper nitrate equivalent to 0.20 mol of copper. The results of the evaluation test of the powder thus obtained are shown in Table 1.

D. The same procedure as that of Example 3 was repeated, except that the aqueous solution of nickel nitrate equivalent to 0.80 mol of nickel was changed to an aqueous solution of nickel nitrate equivalent to 0.40 mol of nickel and an aqueous solution of copper nitrate equivalent to 0.40 mol of copper. The results of the evaluation test of the powder thus obtained are shown in Table 1.

Example 6

A. The same procedure as that of Example 3 was repeated, except that the aqueous solution of nickel nitrate equivalent to 0.80 mol of nickel was changed to an aqueous solution of nickel nitrate equivalent to 0.70 mol of nickel and an aqueous solution of bismuth nitrate equivalent to 0.10 mol of bismuth. The results of the evaluation test of the powder thus obtained are shown in Table 1.

B. The same procedure as that of Example 3 was repeated, except that the aqueous solution of nickel nitrate equivalent to 0.80 mol of nickel was changed to an aqueous solution of nickel nitrate equivalent to 0.60 mol of nickel and an aqueous solution of bismuth nitrate equivalent to 0.20 mol of bismuth. The results of the evaluation test of the powder thus obtained are shown in Table 1.

TABLE 1

| | | Composition | | | | | | Particle Diameter | | |
|---|---|---|---|---|---|---|---|---|---|---|
| | | Ag (x mol. ratio) | Ni (y mol. ratio) | Cu (z mol. ratio) | Bi (z mol. ratio) | x/(y + z) | y + z | Av. particle Diameter (μm) | <3 μm (%) | >21 μm (%) |
| Comparative Example 1 | Silver oxide powder | 1.00 | — | — | | | | | | |
| Comparative Example 2 | Silver oxide powder | 1.00 | — | — | | | | | | |
| Comparative Example 3 | Ag—Ni oxide | 1.00 | 1.00 | 0.00 | 0.00 | 1.00 | 1.00 | 5 | 36 | 12 |
| Example 1 | Ag—Ni oxide | 1.05 | 0.95 | 0.00 | 0.00 | 1.11 | 0.95 | 5 | 34 | 13 |
| Example 2 | Ag—Ni oxide | 1.10 | 0.90 | 0.00 | 0.00 | 1.22 | 0.90 | 6 | 33 | 13 |
| Example 3 | Ag—Ni oxide | 1.20 | 0.80 | 0.00 | 0.00 | 1.50 | 0.80 | 7 | 32 | 15 |
| Reference Example 1 | Mix of 75% Comp. Ex. 3 + 25% Ag$_2$O | | | | | | | | | |
| Example 4 | Ag—Ni oxide | 1.30 | 0.70 | 0.00 | 0.00 | 1.86 | 0.70 | 7 | 32 | 15 |
| Reference Example 2 | Mix of 64% Comp. Ex. 3 + 36% Ag$_2$O | | | | | | | | | |
| Reference Example 3 | Ag—Ni oxide | 1.40 | 0.60 | 0.00 | 0.00 | 2.33 | 0.60 | 7 | 32 | 15 |
| Example 5A | Ag—Ni—Cu oxide | 1.10 | 0.72 | 0.18 | | 1.22 | 0.90 | 7 | 29 | 13 |
| Example 5B | Ag—Ni—Cu oxide | 1.10 | 0.54 | 0.36 | | 1.22 | 0.90 | 2 | 61 | 5 |
| Example 5C | Ag—Ni—Cu oxide | 1.20 | 0.60 | 0.20 | | 1.50 | 0.80 | 6 | 31 | 12 |
| Example 5D | Ag—Ni—Cu oxide | 1.20 | 0.40 | 0.40 | | | 0.80 | 2 | 60 | 7 |
| Example 6A | Ag—Ni—Bi oxide | 1.20 | 0.70 | | 0.10 | 1.50 | 0.80 | 8 | 25 | 14 |
| Example 6B | Ag—Ni—Bi oxide | 1.20 | 0.60 | | 0.20 | 1.50 | 0.80 | 3 | 48 | 8 |

| | | BET (m$^2$/g) | Chem. Analysis Ag (%) | Molding Density (g/ml) | Discharge capacity (mAh/g) End at 1.2 V | Discharge capacity (mAh/cc) | Resistivity (Ω-m) |
|---|---|---|---|---|---|---|---|
| Comparative Example 1 | Silver oxide powder | 0.35 | 93.0 | 6.40 | 220 | 1408 | >100000 |
| Comparative Example 2 | Silver oxide powder | 0.16 | 93.0 | 6.40 | 220 | 1408 | >100000 |
| Comparative Example 3 | Ag—Ni oxide | 52.4 | 52.8 | 4.08 | 203 | 828 | 1.7 |
| Example 1 | Ag—Ni oxide | 45.8 | 55.4 | 4.25 | 205 | 871 | 1.3 |
| Example 2 | Ag—Ni oxide | 30.3 | 57.5 | 4.38 | 211 | 924 | 0.8 |
| Example 3 | Ag—Ni oxide | 22.3 | 62.5 | 4.70 | 217 | 1020 | 1.0 |
| Reference Example 1 | Mix of 75% Comp. Ex. 3 + 25% Ag$_2$O | | 62.9 | 4.44 | | | 13 |
| Example 4 | Ag—Ni oxide | 18.2 | 66.7 | 4.99 | 219 | 1093 | 9.8 |
| Reference Example 2 | Mix of 64% Comp. Ex. 3 + 36% Ag$_2$O | | 67.3 | 4.90 | | | 28 |
| Reference Example 3 | Ag—Ni oxide | 14.5 | 71.5 | 5.31 | 218 | 1158 | 15 |
| Example 5A | Ag—Ni—Cu oxide | 41.3 | 52.8 | 4.21 | 207 | 872 | 0.88 |
| Example 5B | Ag—Ni—Cu oxide | 32 | 52.0 | 4.15 | 210 | 871 | 1.3 |
| Example 5C | Ag—Ni—Cu oxide | 23.9 | 62.5 | 4.78 | 220 | 1052 | 1.2 |
| Example 5D | Ag—Ni—Cu oxide | 18.7 | 61.3 | 4.66 | 222 | 1035 | 3.8 |
| Example 6A | Ag—Ni—Bi oxide | 30.3 | 65.1 | 4.60 | 206 | 948 | 8.5 |
| Example 6B | Ag—Ni—Bi oxide | 31 | 60.0 | 4.60 | 179 | 823 | 6.9 |

The results shown in Table 1 reveal the following.

Figure 3:
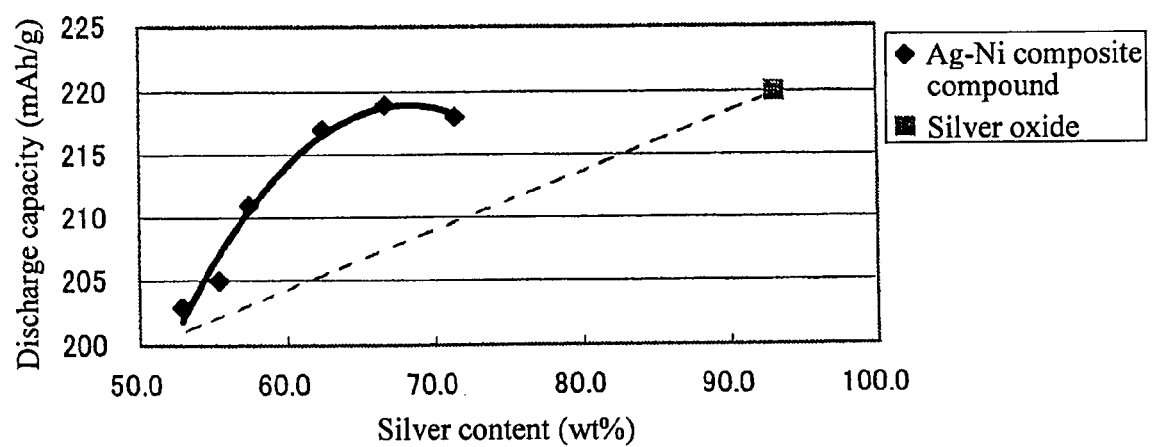
FIG. 3 is a graph showing the relationship between the Ag content in the excess Ag—Ni oxide according to the invention, and the discharge capacity of the excess Ag—Ni oxide.

(1) The excess Ag—Ni oxide of the present invention contains more excess Ag than AgNiO$_2$, and discharge capacity rises with the increase in the degree of excess Ag (see FIG. 3).

(2) As the degree of excess Ag in the excess Ag—Ni oxide of the present invention increases compared to AgNiO$_2$, the molding density thereof also increases, and in terms of discharge capacity per unit volume (mAh/cc), a higher capacity can be obtained than in the case of AgNiO$_2$.

(3) A comparison between the AgNiO$_2$ and Ag$_2$O mixtures of Reference Examples 1 and 2, and the excess Ag—Ni oxides of Examples 3 and 4 having an Ag content equivalent to that of those mixtures, shows that the excess Ag—Ni oxides have a higher molding density and lower resistivity than the mixtures.

(4) The excess Ag—Ni-M oxides of Examples 5 and 6 in which Cu or Bi is substituted for part of the Ni, form positive electrode materials having the same high discharge capacity and low resistivity as an excess Ag—Ni oxide.

Example 7

The powder of Example 3 (Ag$_{1.2}$Ni$_{0.8}$O$_2$) and the granular silver oxide used in Comparative Example 2 were mixed together in various proportions, and the pellet strength, resistivity and discharge capacity of the mixtures measured. The results are shown in Table 2.

TABLE 2

| Amount mixed to silver oxide | Pellet strength (Relative value) | Resistivity ($\Omega \cdot m$) | Discharge capacity (mAh/g) |
| --- | --- | --- | --- |
| 0% Only silver oxide | 100 | >100000 | 220 |
| 5% | 116 | 10000 | 221 |
| 10% | 145 | 500 | 219 |
| 20% | 194 | 180 | 219 |
| 30% | 213 | 60 | 216 |
| 100% Simple Ag—Ni oxide | 1339 | 1 | 217 |

As shown in Table 2, when the excess Ag—Ni oxide powder of this invention is mixed with silver oxide, the discharge capacity is maintained, the resistivity decreases in accordance with the mixture amount and pellet strength increases. Those effects are manifested starting with an excess Ag—Ni oxide powder blend amount in the order of 5 wt %. Therefore, initial discharge continuity can be ensured even with a blend amount of 5 wt %. Once discharge begins, metallic silver produced by the discharge exhibits conductivity, thus functioning as a battery.

IN THE DRAWINGS

FIG. 1
Intensity (CPS)
    Example 4
    Example 3
    Comparative Example 3

FIG. 2
Intensity (CPS)
    ○ Ag$_2$O peak
    Comparative Example 3+3% Ag$_2$O
    Comparative Example 3+1% Ag$_2$O
    Comparative Example 3

FIG. 3
    ♦ Ag—Ni composite compound
    ■ Silver oxide
Discharge capacity (mAh/g)
Silver content (wt %)

What is claimed is:

1. A battery positive electrode material comprising a conductive chemical compound represented by a general formula Ag$_x$Ni$_y$M$_z$O$_2$, wherein M represents at least one of Cu and Bi, and wherein X/(Y+Z) is greater than 1.1 and does not exceed 1.9 and Z is from 0 to 0.4.

2. A battery positive electrode material according to claim 1, in which the conductive chemical compound is represented by a general formula Ag$_x$Ni$_y$O$_2$, wherein X/Y is greater than 1.1 and does not exceed 1.9, and comprises a crystal that does not exhibit an X-ray diffraction peak of Ag$_2$O or AgO.

3. A battery positive electrode material according to claim 1 in which the conductive chemical compound has an X-ray diffraction main peak that is identical to that of AgNiO$_2$ (wherein X=Y=1).

4. A battery positive electrode material, which is used to obtain a mixed battery positive electrode material which comprises not less than 3 weight-percent of the battery positive electrode material of claim 1 blended with silver oxide (Ag$_2$O).

* * * * *